United States Patent [19]
Dvorak et al.

[11] 3,726,597
[45] Apr. 10, 1973

[54] CONTROLLED ENVIRONMENT CULTURE SYSTEM FOR LIGHT MICROSCOPY

[75] Inventors: James A. Dvorak; Woodrow F. Stotler, both of Bethesda, Md.

[73] Assignee: The United States of America as represented by the Secretary of the Department of Health, Education and Welfare

[22] Filed: Mar. 9, 1972

[21] Appl. No.: 233,194

[52] U.S. Cl. ............................... 356/244, 350/92
[51] Int. Cl. ........................................ G01n 21/16
[58] Field of Search ......................... 356/244, 246; 350/92, 94, 95

[56] References Cited

UNITED STATES PATENTS

| 2,940,360 | 6/1960 | Carter, Jr. | 350/95 |
| 2,942,520 | 6/1960 | Rose | 350/95 |
| 3,220,300 | 11/1965 | Von Huene | 350/92 |

*Primary Examiner*—William L. Sikes
*Attorney*—Alvin Browdy et al.

[57] ABSTRACT

A cell culture chamber for use in optical microscopic techniques and equipment is provided with an apertured holder carrying two coverglasses mounted strain free and separated by a stainless steel spacer with tubes permanently attached therethrough. A pressure plate holds the coverglasses in place by being compressed by a sealing ring and a removable snap ring.

8 Claims, 2 Drawing Figures

PATENTED APR 10 1973          3,726,597

CONTROLLED ENVIRONMENT CULTURE SYSTEM FOR LIGHT MICROSCOPY

FIELD OF INVENTION

The present invention relates to cell culturing, and, more particularly, to a cell culture chamber which has optically flat, strain-free, parallel surfaces with a geometric thickness usable for all extant optical techniques and equipment and which is a completely closed system to safely observe, handle and contain living cells or metazoan organisms including human pathogens.

BACKGROUND OF THE INVENTION

Biologists have long been concerned with following the growth of a single cell by direct microscopic observation. Accordingly, numerous culture chambers have been developed for use with the light microscope to study living cells or metazoan organisms. Some of the early prior art systems used concave slides for hanging-drop cultures. For many cell types this kind of culture is inadequate for normal cell growth as they require periodic replenishment of both gas and liquid phases of the growth medium. Furthermore, a concavity slide introduces adverse optical effects in the light microscope.

Thus, micro-culture chambers were developed through which aerated growth medium could be constantly perfused. Certain characteristics are extremely desirable in such a microperfusion chamber and heretofore no prior art chamber has satisfactorily fulfilled all of these requirements. To be entirely satisfactory, a culture chamber would have to have the following characteristics:

1. Usable with all extant transmitted light microscopy techniques including bright field and phase contrast microscopy (Zernike) with high numerical aperture, short working distance objectives and condensers; double beam quantitative interference microscopy (Jamin-Lebedeff or Mach-Zehnder); differential interference contrast microscopy (Nomarski); and polarizing microscopy. This necessitates that the assembled chamber have optically flat, strain-free, parallel surfaces with a fixed geometric viewing thickness not exceeding 1.2 mm.

2. A completely closed system to safely observe, handle and contain human pathogens or other hazardous materials.

3. Sterilizability of the assembled chamber both prior to use and as a means of decontamination at the end of the experiment.

4. Durable construction with biologically inert, non-toxic materials.

5. Design simplicity permitting rapid and easy cleaning and assembly of the chamber.

6. The ability, after removal of the chamber from the microscope, to rapidly relocate cells or other objects of interest from a fixed point of reference.

7. Long-term maintenance of optimum physiologic conditions for the cells or organisms being studied.

8. Rapid exchange or replacement of the culture media to observe and study the effects of varying physiologic parameters as well as the instantaneous fixation of the cells for subsequent procedures such as electron microscopy, immunofluorescence, histochemistry or autoradiography.

The microperfusion chamber described by Poynton and Branton in *Experimental Cell Research* 60 (1970) 109-114 attempts to solve many of the above problems but the resultant chamber is not entirely satisfactory. The Poynton device as well as many other prior art devices rely upon compressible spacers to maintain the space between the glass surfaces of the chamber. The two pieces of glass are placed on either side of the spacer and then set screws or similar devices are tightened around the periphery of the chamber to produce a seal. However, it is impossible to tighten screws or similar devices uniformly to produce a chamber which is truly strain free and in which the two pieces of glass are precisely parallel.

Another disadvantage of prior art devices is that when completely assembled, the chamber is sealed so that if autoclaved they would explode. The prior art devices must be autoclaved, disassembled and then assembled under sterile conditions which is difficult or, at best, they can be autoclaved partially assembled and the assembly can be completed after autoclaving, thus increasing the danger of contaminating the chamber.

SUMMARY OF THE INVENTION

Accordingly, it is an object of the present invention to overcome the deficiencies of the prior art.

It is another object to provide for improved and more efficient cell culturing.

It is a further object to provide an improved cell culture chamber.

It is another object to provide a cell culture chamber which has optically flat, strain free, parallel surfaces with a fixed geometric thickness usable for all extant optical techniques and methods.

It is another object to provide a cell culture chamber which operates as a completely closed system to safety observe, handle and contain human pathogens or other hazardous materials, and is sterilizable as an assembled unit both prior to use and as a means of decontamination at the end of the experiment.

It is still another object to provide a cell culture chamber which relies upon durable construction with biologically inert non-toxic materials and utilizes design simplicity to permit rapid and easy cleaning and assembly of the chamber.

It is yet another object to permit rapid relocation of cells or other objects of interest from a fixed point of reference after removal of the chamber from the microscope.

It is another object of the present invention to provide a cell culture chamber which allows long-term maintenance of optimum physiologic conditions for the cells or organisms being studied and permits rapid exchange or replacement of the culture media to observe and study the effects of varying physiologic parameters as well as the instantaneous fixation of the cells for subsequent procedures such as electron microscopy, immunofluorescene, histochemistry or autoradiography.

BRIEF DESCRIPTION OF THE DRAWINGS

These and other objects will become more apparent from the following disclosure of an illustrative embodiment taken in conjunction with the drawing in which.

DESCRIPTION OF THE PREFERRED EMBODIMENT

Figure 1:
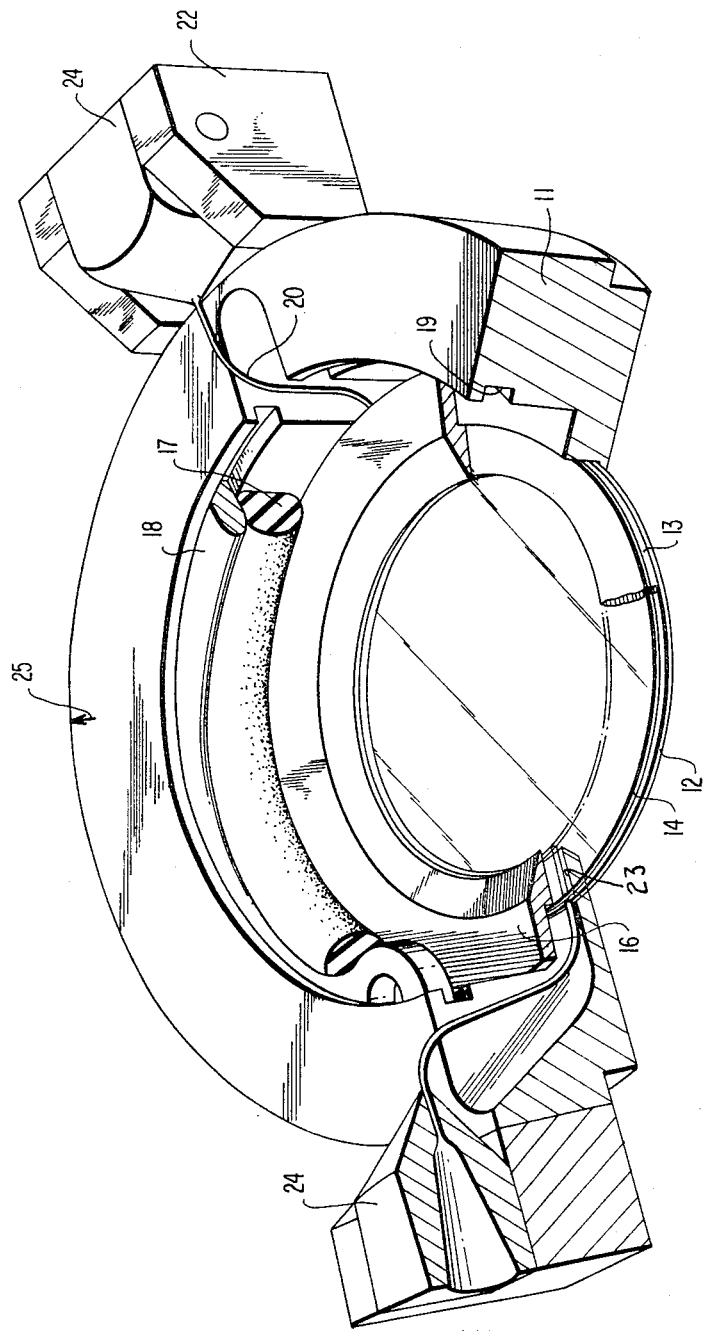
FIG. 1 is a perspective view, partially cut away, of a cell culture chamber in accordance with the present invention.
Figure 2:
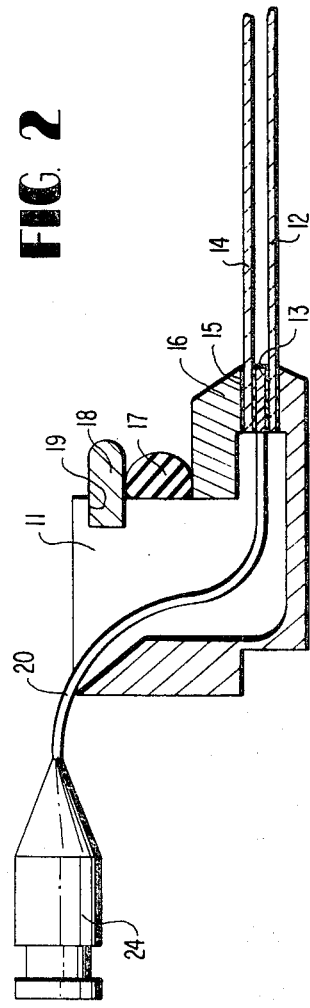
FIG. 2 is a partial cross-sectional view through a portion of the assembled cell culture chamber of FIG. 1.

Referring to the drawing, a holder 11 having a serial identification number engraved on both faces is provided, preferably made of stainless steel, and having a platform portion 23. A lower coverglass 12 rests on the platform 23 which is preferably coated with a thin layer 15 of Teflon (polytetrafluoroethylene). It is desirable that a Teflon layer be placed at all steel-glass interfaces to prevent the sharp steel edge from acting as a die and cutting the coverglass under the influence of high perfusion pressures.

A second coverglass 14 is placed parallel to coverglass 12 and a spacer 13, preferably of stainless steel, is placed between these coverglasses 12 and 14. Such coverglasses are preferably free of lead oxide and should have minimal strain or other optical defects; this is particularly important when polarized light is used.

For some optical uses of the cell culture chamber it is highly important that the finished spacer 13 between the coverglasses 12 and 14 have a thickness of 635 $\mu$m with a tolerance of 25 $\mu$m. This separation will give a total outside dimensional measurement of thickness between the two glass surfaces of 1.2 mm maximum (using No. 1 ½ thickness coverglasses). This is the same thickness as a properly corrected glass microscope slide and coverglass. It permits microscopic examination of cultured cells under the same optical conditions as those obtained using a microscope slide and coverglass.

Suitable perfusion ports, preferably consisting of 27 gauge stainless steel tubing 20 fitted with stainless steel Luer-taper hubs 24, pass through and are permanently bonded to the body of the spacer 13 with a solder containing no lead or cadmium, or other suitable adhesive. Both surfaces of the spacer 13 which contact the coverglasses 12 and 14 are coated with an 80 $\mu$m layer of Teflon.

A pressure plate 16, suitably of stainless steel and having a stepped bottom surface which contacts the upper coverglass 14, is provided peripherally above the upper coverglass 14. This step, which is preferably coated with an 80 $\mu$m layer of Teflon, applies uniform pressure on the coverglass-spacer assembly 12, 13, 14.

A silicone rubber O-ring 17, having its outer diameter flat to fit the recessed well of the holder 11, is fitted over the pressure plate 16. The O-ring 17 may be made of any compressible material which is non-toxic and dimensionally stable from approximately $-60°$ to $+230°$ C. It may be molded, machined and/or ground to the desired shape.

The entire assembly is sealed through use of a stainless steel snap ring 18 which fits into a groove 19 in the holder 11. The combination of snap ring 18 and O-ring 17 which is external to the cell chamber rather than between the glass surfaces permits predetermined pressures to be attained every time the snap ring 18 is snapped into place. There are no clamps or screws to adjust in order to obtain the necessary seal.

In the manufacture of the device all stainless steel parts are preferably machined dry without oil lubricants. This is done because cutting oils are toxic and cannot be practically removed from the steel after machining has been completed.

Suitable stabilizer clamps 22 may also be included and located on opposite sides of the cell chamber. The clamps 22 support the Luer-taper hubs 24 used for connecting the perfusion tubing to the device and such clamps 22 prevent the needles 20 extending through the stainless steel spacer ring 13 from being sheared off. This would ruin the chamber and would permit the escape of the material being cultured, resulting in the possible contamination of the investigator and the laboratory with human pathogens. The stabilizer clamps 22 also act as handles which facilitate handling of the cell chamber.

In order to facilitate relocation of cells or other objects of interest from a fixed point of reference, the holder 11 may have machined onto one edge an alignment radius 25 which fits an alignment pin on the mechanical stage plate of the microscope.

One method of assembly and operation will now be described.

I. Selection and Preparation of Coverglasses

1. Select No. 1 ½ coverglasses. They should be 170 $\mu$m thick ($\pm 5$ $\mu$m if dry objectives without correction collars are to be used). Flat, strain-free coverglasses are essential when procedures employing polarized light are anticipated.

2. Place coverglasses in a $HNO_3$—$H_2O$ (1:1) solution, heat to 90° C. in a fume hood, turn off heat and allow to stand overnight.

3. Rinse coverglasses with tap water.

4. Place coverglasses in EDTA (versene) solution (1 g. EDTA/liter distilled water)

5. Rinse three times in distilled water.

6. Rinse two times in glass-distilled water.

7. Place coverglasses in absolute ethanol (99.5 percent) for one-half hour.

8. Remove coverglasses individually from alcohol with clean, plastic-tipper forceps, wipe dry gently with lens paper held between thumb and forefinger with clean gauge pads to prevent skin oils from contacting alcohol or coverglass.

9. Place the dried and polished coverglasses in a clean Petri dish on filter paper. Six coverglasses can be placed in a standard 90 mm Petri dish.

10. Wrap Petri dish in aluminum foil to keep out dust.

II. Cleaning, Assembly and Sterilization of Chamber

1. Soak all chamber parts in diethyl ether for one-half hour. Repeat twice using fresh ether. This operation removes microscope immersion oil from chamber parts.

2. Wash all parts of chamber in Hemosol solution at 71° C. with a stiff brush (do not use the brush to clean the Teflon seals).

3. Rinse with tap water.

4. Rinse with running distilled water.

5. Pass one or two cc's of distilled water through each perfusion tube in the spacer.

6. Place washed and rinsed chamber parts in a beaker of distilled water and boil on a hot plate for one-half hour.

7. Remove boiled chamber parts from water, place in open glass Petri dishes and a dry in an oven at 121° C. for one-half hour.

8. Assemble chamber using clean forceps to handle chamber parts and plastic tipped forceps to handle coverglasses and Teflon seals. The order of assembly is as follows: Holder, Teflon seal, coverglass, Teflon seal, spacer, Teflon seal, coverglass, Teflon seal, pressure plate, silicone O-ring, and snap-ring. Make sure all components are seated properly before installing the snap-ring. Tighten the hubs in the hub holders after the snap-ring is installed.

9. Place the assembled chamber in a clean 90 mm. Petri dish.

10. Sterilize the assembled chamber for six hours at 140° C. in a drying oven. Wrap Petri dish in aluminum foil to keep out dust. Chamber is now ready to be used.

III. Inoculation of Chamber with Cells

NOTE: Sterile technique should be used throughout this procedure.

1. Attach i.v. extension tubing (e.g., Bardic tubing) to outlet bottle leaving the male end covered. NOTE: Check for defects in the ends of i.v. tubing before any connections are made.

2. Open Petri dish containing assembled chamber and firmly connect male end of i.v. extension tubing to outlet port hub. Cover the Petri dish to keep the inlet port sterile.

3. Fill a 1 ml tuberculin syringe with 0.8 to 1.0 cc. of the desired cell suspension.

4. Attach syringe to inlet port and slowly charge the chamber, being careful to eliminate all air bubbles by tilting the chamber so that the outlet port is up.

5. Leave the syringe in place and position the chamber so that the cells settle onto the desired coverglass (upper coverglass for standard microscope, lower coverglass for inverted microscope). Incubate the chamber at 37° C. in this position for an appropriate period of time.

6. When ready to flush the chamber at the end of the settling period, fill a 20 ml. glass syringe with media, expelling all air bubbles.

7. Attach i.v. extension tubing to the syringe and fill tubing with media, again expelling all air bubbles.

8. Remove the tuberculin syringe from the inlet port and attach the media-filled i.v. extension tubing.

9. Clear the system of air bubbles so that the only bubbles visible are in the distal end of the outlet tubing just before it enters the outlet bottle.

10. Flush the chamber with an appropriate amount of media to remove all non-adhering cells from the chamber (about 4 cc).

11. Place the syringe on a perfusion pump capable of sustaining a media flow rate of about 1 cc per hour.

The chamber is then placed on the mechanical stage plate of the microscope for observation. This stage plate is preferably constructed of carbon steel, preferably plated, with a suitable material which allows the use of magnetic clips to hold the chamber firmly in place. Example of suitable plating material for the stage plate would be cadmium or chromium. Subsequent additions to the chamber (e.g., infectious agents, radiochemicals, etc.) are made through the remaining input port of the Teflon 3-way valve.

A syringe infusion pump is used to continuously perfuse the chamber at a constant rate with fresh media. The perfusion characteristics of the chamber are directly related to the flow rate of the media. A flow rate of approx. 1 ml/h results in a clean "sweeping action" of the perfusate through the chamber. Lower flow rates result in diffusion of the perfusate in the chamber; higher flow rates result in vortical mixing.

Chamber temperature can be maintained with an air curtain incubator or similar device. The relatively large mass of the steel holder and mechanical stage plate act as a thermal buffer, thus restricting temperature fluctuations to approx. 0.2° C.

The lower aperture of holder 11 should be large enough to allow the appropriate optical element of the microscope unrestricted access to the lower coverglass. The appropriate optical element may consist of a condenser in the case of an upright microscope or an objective in the case of an inverted microscope. In one embodiment, the aperture is 19.0 mm. in diameter. The upper opening of the holder 11 is 30.5 mm. diameter with a total thickness of 8.9 mm. The coverglasses are 25 mm. in diameter the the spacer has a 19.0 mm. aperture. The Teflon layers are about 80 $\mu$m thick.

It is important to understand that the particular materials and dimensions set forth in this specification are only suggested embodiments. Any non-toxic, biologically inert materials may be used and those of ordinary skill in the art will readily be able to design dimensions which will retain the inventive concept of the present invention but will adapt it for other uses. It is accordingly to be understood that changes may be made without departing from the invention.

What is claimed is:

1. A cell culture chamber for use with light microscopy techniques, comprising:
    a holder having an aperture and a peripheral groove extending outwardly from said aperture therein;
    a first transparent cover means held by said holder and covering said aperture;
    a second transparent cover means within said holder and positioned above said first transparent cover means;
    rigid spacer means within said holder and between said first and second transparent cover means, for maintaining said first and second transparent cover means at a predetermined distance from one another;
    a rigid pressure plate within said holder and contacting said second transparent cover means;
    compression means within said holder and contacting said pressure plate for urging said pressure plate against said second transparent cover means, said spacer means, said first transparent cover means, and said holder;
    uniform pressure applying means for applying uniform pressure to said compressing means, said uniform pressure applying means comprising a snap element fitting into said peripheral groove of said holder; and
    at least two rigid tubes passing through said rigid spacing means for passing fluid into and out of the chamber defined by said first and second transparent cover means and said spacer means.

2. A cell culture chamber in accordance with claim 1, wherein:

said first and second transparent cover means are made of glass having no substantial strain or other optical defects.

3. A cell culture chamber in accordance with claim 2, wherein:
said holder, said spacer means, said pressure plate and said tubes are all made of stainless steel machined dry, and wherein said tubes and spacer are integral.

4. A cell culture chamber in accordance with claim 3, wherein:
all metal surfaces which contact glass are coated with a thin layer of protective plastic.

5. A cell culture chamber in accordance with claim 1, wherein:
said holder is generally round and said aperture therein is round, said holder having a recess therein above said aperture with a diameter greater than that of said aperture, and said groove is located on the wall of said recess;
said first cover means which covers said aperture rests on the bottom of said recess;
said spacer means, said pressure plate and said compression means are ring-shaped and the apertures thereof are at least substantially as large as the aperture of said holder; and
said snap element comprises a snap ring.

6. A cell culture chamber in accordance with claim 1, wherein:
said holder has an alignment radius machined on its periphery for alignment with an alignment pin on a microscope stage, and
said holder has a number inscribed on both faces to allow rapid identification of said holder.

7. A cell culture chamber in accordance with claim 1, further including:
hub means connected to each of said tubes for rapid and easy connection with tubes or syringes for feeding or carrying away material to or from the chamber.

8. A cell culture chamber in accordance with claim 7, further including:
hub holding means connected to said holder and attachable to said hub means for rigidly holding said hub means in place during operation.

* * * * *